Figure 1:
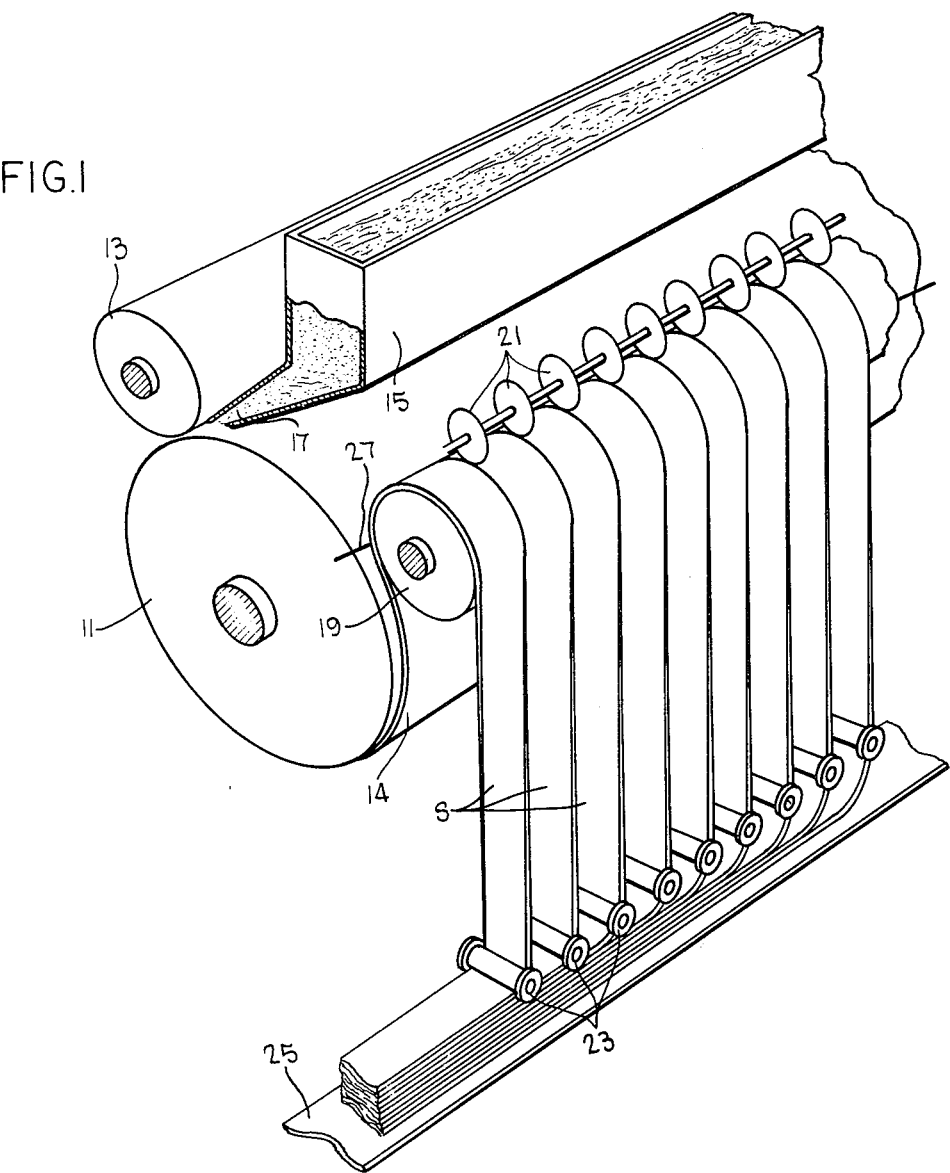

United States Patent [19]

Warwick

[11] 3,900,574

[45] Aug. 19, 1975

[54] TREATMENT OF CHEESE SLICES TO PREVENT STICKING TOGETHER

[75] Inventor: Leonard A. Warwick, Niles, Ill.

[73] Assignee: Kraftco Corporation, Glenview, Ill.

[22] Filed: Oct. 3, 1973

[21] Appl. No.: 402,892

Related U.S. Application Data

[63] Continuation-in-part of Ser. No. 141,050, April 29, 1971, abandoned.

[52] U.S. Cl. ............... 426/274; 426/188; 426/273; 426/302; 426/303; 426/361; 426/515; 426/518; 426/521

[51] Int. Cl. . A23c 19/00; A23c 19/02; A23c 19/14

[58] Field of Search ....... 426/89, 92, 121, 188, 273, 426/274, 289, 302, 303, 361, 415, 515, 518, 521

[56] References Cited
UNITED STATES PATENTS

| | | | |
|---|---|---|---|
| 2,352,210 | 6/1944 | Kraft | 426/518 |
| 2,927,029 | 3/1960 | Long | 426/121 |
| 3,141,779 | 7/1964 | Podebradsky et al. | 426/303 X |
| 3,453,120 | 7/1969 | Olson et al. | 426/92 |
| 3,479,024 | 11/1969 | Miller et al. | 270/58 |
| 3,519,470 | 7/1970 | Gordon et al. | 426/415 |

Primary Examiner—David M. Nafe
Attorney, Agent, or Firm—Fitch, Even, Tabin & Luedeka

[57] ABSTRACT

A stack of individual slices of cheese product is provided. At least one surface of every individual slice in the stack is provided with a thin coating of starch or mixtures of starch and a gum. The invention further provides a method for applying the starch or starch mixture to a cheese product during the high-speed manufacture of individual slices of the cheese product.

2 Claims, 2 Drawing Figures

PATENTED AUG 19 1975

3,900,574

INVENTOR
LEONARD A. WARWICK
Fitch, Even, Tabin, & Luedeka
ATTYS.

TREATMENT OF CHEESE SLICES TO PREVENT STICKING TOGETHER

The present invention is a continuation-in-part of application Ser. No. 141,050, filed Apr. 29, 1971, now abandoned.

The present invention relates generally to a method for treating cheese products which are formed into stacked slices so as to minimize sticking of the slices to each other. More particularly, the present invention relates to a method for applying a thin coating of starch or a mixture of starch and gum to sliced cheese products which are formed into stacks of individual slices of cheese.

Methods for the manufacture of stacked individual slices of cheese are well known in the cheese art. U.S. Pat. No. 2,352,210 to Kraft, issued June 27, 1944, discloses apparatus for continuously producing a plurality of ribbons of a cheese product and for stacking and cutting such ribbons to form stacks of individual slices of cheese. The stacked slices of cheese are then packaged to provide a package of individual slices of cheese which may be removed, one by one, by the consumer as they are required. It is also known to prepare stacks of cheese slices by cutting the slices from a loaf of cheese and thereafter assembling the individual slices into stacks. However, the manufacture of stacks of individual slices of cheese products has been limited to a relatively few types of cheese products because of problems relating to sticking together of individual slices in the stack. In this connection, the manufacture of stacks of individual slices of cheese has been primarily limited to certain types of process cheese.

The term "process cheese" as used herein refers to cheese which is made by grinding and mixing together by heating and stirring one or more natural cheeses of the same or two or more varieties. An emulsifying agent is added to the mixture, and the mixture is worked into a homogeneous plastic mass. Various acids may be added, such as lactic acid, citric acid, acetic acid, phosphoric acid or vinegar. A small amount of cream, water, salt, color and spices or flavoring materials may be added. The moisture level of process cheese generally does not exceed about 40 percent. Process cheese has a minimum fat level of about 50 percent on a dry basis.

As indicated, the preparation of stacks of individual slices of cheese has generally been restricted to certain types of process cheese. When high levels of aged cheese are used in the manufacture of process cheese, there is a tendency for individual slices in the stack to stick together. It has not been generally considered feasible to prepare stacks of individual slices of cheese food or cheese spread. Also, process cheese slices containing low levels of fat tend to stick very badly when the slice was assembled into a loaf.

The term "cheese food" as used herein refers to a cheese product which is prepared generally from the materials and the procedure indicated above for process cheese. However, cheese food may have optional dairy ingredients added thereto, such as cream, milk, skim milk, cheese whey or any of these from which part of the water has been removed. The moisture level is generally higher than that of process cheese, and may be up to about 44 percent. The fat is at least about 23 percent of the cheese food product but is usually less than 50 percent. The term "cheese spread" refers to a cheese product which is generally similar to cheese food products but may have a moisture level of up to about 60 percent. The minimum fat level for cheese spread is about 20 percent. It would be desirable to prepare stacks of individual slices of any type of process cheese and to prepare stacks of individual slices of cheese foods and cheese spreads without incurring the problem of sticking together of the slices.

Accordingly, it is a principal object of the present invention to provide a method for preparing stacks of individual slices of cheese products whereby the individual slices may be readily separated from each other. It is another object of the present invention to provide a method for effecting easy release of individual slices of cheese products when the slices are arranged in a stack.

Figure 2:
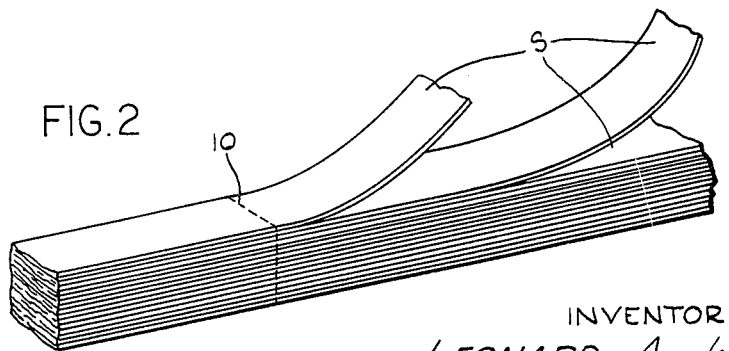

These and other objects of the present invention will become more apparent from the following detailed description, and the accompanying drawing, wherein:

FIG. 1 is a diagrammatic, perspective view, partially broken away, of apparatus useful in the practice of the present invention; and FIG. 2 is a perspective view illustrating a method for assembling a plurality of cheese strips into a stacked array.

Generally, in accordance with various features of the present invention, individual slices of a cheese product are provided. At least one surface of each individual slice is provided with a thin coating of hydrated starch or mixtures of hydrated starch and a hydrated gum. The individual slices of cheese are then assembled into a stack. The invention further provides a method for applying the starch and starch mixtures to a cheese product during the high-speed manufacture of individual slices of the cheese product. For purposes of the present disclosure both starch and the gums present in the starch mixture are considered to be hydrocolloid materials and are sometimes referred to as such hereinafter.

Referring now to the drawings, apparatus is set forth generally as described in U.S. Pat. No. 2,352,210 to Kraft, which is suitable for forming stacks of individual slices of cheese. In the drawings, cheese, in sheet or leaf form is formed into ribbons or web-like strips designated S, and the ribbons are brought into relatively superposed face-to-face relation with their longitudinal side edges accurately registered. As shown in FIG. 2, a plurality of strips or ribbons S, when assembled in the manner stated, form a multi-ply elongated bar or loaf of cheese which may be cut transversely as indicated by the dotted line 10 in FIG. 2, to form a packagable loaf of individual slices of cheese. The slices may be formed by the apparatus of any desirable thickness, but it is desirable that the thickness in any event be such that the individual cheese slices are ready for use merely upon separation from the assembly of individual slices and without slicing the thickness thereof.

The apparatus, as shown in FIG. 1, for producing the individual cheese slices, comprises a drum 11, a doctor roll 13 and a take-off roll 19. The drum 11, the roll 13 and the roll 19 are journaled for rotation in suitable roller bearings which are supported by brackets in a suitable frame structure; said bearings, brackets and frame structure are not shown.

Cheese, preferably process cheese in molten or fluid form, is delivered from processing apparatus (not shown) to a hopper or head box 15 which is supported on frame members (not shown). The hopper 15 is provided with a downwardly inclined outlet spout or nozzle 17 which delivers the molten or fluid cheese into the nip or bite of the doctor roll 13 and drum 11 which are rotated in such direction that cheese is rolled out between them into a thin sheet or web 14 which is caused to follow the drum 11.

From the drum 11, the web 14 of cheese is delivered to take-off roll 19. The cheese web 14 travels upwardly over and downwardly from the take-off roll 19 and while on the roll is slitted into a plurality of parallel ribbons or strips S by means of a series of circular slitting knives 21.

The ribbons S of cheese are guided from the take-off roll 19 downwardly and each ribbon of cheese is twisted through an angle of 90°. The cheese ribbons pass around and under spools 23 and are delivered to a conveyor 25 which carries the plurality of stacked cheese ribbons forwardly for cutting to provide stacks of individual cheese slices and any desired packaging or other operations.

While particular apparatus has been described for the manufacture of individual slices of cheese, it should be understood that the method of the present invention for treating cheese products which are formed into stacked slices is suitable for the treatment of cheese formed into stacked slices by any method or apparatus. In particular, it is contemplated that individual slices of cheese prepared by cutting slices from a loaf or block of cheese can be treated by the method of the invention.

With further reference to the apparatus of FIGS. 1 and 2, the drum 11 is of hollow construction and is provided internally with a cooling fluid. When molten cheese is delivered into the bite of the drum 11 and roll 13, the cheese will be rolled out into a thin sheet or web 14 on the surface of the drum 11. The temperature of the drum 11 is maintained at a sufficiently low point that the cheese web 14 will be sufficiently set as it emerges from between the roll 13 and drum 11 to be self-sustaining in sheet form, corresponding in thickness to the space between the roll 13 and drum 11. During the path of travel of the cheese web 14 around the drum 11, the cheese web 14 is gradually cooled and becomes more completely set so that by the time it is transferred to the take-off roll 19 it is of adequate strength to avoid tearing and to insure the delivery of a continuous web of cheese to the slitting knives 21. For separating the cheese web or sheet from the drum 11 for delivery to the roll 19, there is provided a wire 27 which extends transversely of the surface of the drum 11 and is also disposed at an angle so as to extend in a minor degree circumferentially of the roll. The wire 27 is anchored in the frame structure (not shown). The wire 27 serves to effectively separate the cheese web 14 from the surface of the drum 11 and leaves the drum surface clean and in condition for further cooperation with the roll 13 in a continued formation of a cheese web.

In accordance with the present invention, a thin film of starch or mixtures containing a major amount of starch and a minor amount of a gum is applied to at least one surface of a cheese slice at some point prior to forming the slices into stacked individual slices of cheese. The starch or starch mixtures are applied to the cheese slices by spraying an aqueous dispersion of the starch or starch mixtures onto the surface of the cheese at some point prior to forming the cheese into stacked individual slices.

When treating cheese slices prepared by the chill roll method previously described, the exact point of application of the starch or starch mixtures is not critical and the starch or starch mixtures may be applied to the cheese web 14 at any point after the cheese web 14 is formed by passing between the bite of drum 11 and roll 13. The point of application may also be onto the cheese web after the cheese web has been removed from the drum 11 onto the take-off roll 19. Also, the starch or starch mixture may be applied to the clean surface of the drum 11 at a point between take-off roll 19 and roll 13. When the starch or starch mixture is applied to the surface of the drum 13, transfer of the starch or starch mixture onto the cheese web occurs after the cheese web is formed and as it is traveling over the surface of the drum 11 prior to take-up onto the take-off roll 19.

It has been determined that starch and mixtures of a gum and a major amount of starch are suitable for effecting release of individual slices of cheese from a stack of cheese slices. In contrast, other hydrocolloid materials (including the gum of the starch mixture) do not have the desired effectiveness for this purpose. The gum used in the starch mixture may be selected from vegetable gums, such as guar gum, carob bean gum, gum tragacanth and gum karaya; marine gums, such as carrageenan and alginate; cellulose gums, such as carboxymethyl cellulose and mixtures thereof. Any edible food starch may be used as the starch in the method and product of the present invention. A particularly preferred starch is cornstarch. Preferred mixtures are those wherein more than about 50 percent of the mixture is a food starch. Particularly preferred mixtures are those wherein at least about 75 percent of the mixture is a food starch.

In the method of the invention, a dispersion of the starch or starch mixture is prepared by combining the starch or starch mixture with water and agitating to form a hydrocolloid dispersion. In general, the starch or a starch mixture is present in the dispersion at a level sufficient to provide a total level of hydrocolloid of from about 2 to about 5 percent by weight of the dispersion. At lower levels of use, it is difficult to spray a sufficient quantity of the hydrocolloid onto the surface of the cheese product. At higher concentrations than the indicated range, the hydrocolloid dispersion has a viscosity which is too high to provide a suitable dispersion for spraying onto the cheese product.

It is necessary that the hydrocolloid dispersion be heated whether or not heating is required to effect hydration. In this connection, heating pasteurizes the hydrocolloid and prevents the hydrocolloid from contaminating the surface of the cheese. Also heating is used to effect gelatization of the starch. Cheese products, particularly cheese products with high levels of moisture, are highly suitable materials for development of mold and other microbiological growth. For this reason, it is necessary that the fluid dispersion of the hydrocolloid be heated to a temperature and for a time sufficient to effect pasteurization of the dispersion. However, the temperature of the hydrocolloid dispersion at the time of applying the dispersion should not be so great that fat separation from the surface of the cheese slice is encountered. A temperature of from about 160°F to about 190°F for a period of time of at least about 30 minutes is sufficient to effect pasteurization. Lower periods of time may be used at the higher temperature of the range and the time may be as low as about 1 minute at 200°F. When a non-gelatinized starch is used in the hydrocolloid dispersion, the starch must be heated to a temperature of from about 180°F to about 200°F so as to effect gelatinization and hydration of the starch. However, after heat treatment of the hydrocolloid dispersion to effect pasteurization and/or gelatinization, the hydrocolloid dispersion is applied to the surface of the cheese slice while at a temperature no higher than about 190°F.

The hydrocolloid dispersion is applied to the surface of the cheese slice at a level sufficient to provide from about 0.01 to about 1.0 grams of hydrocolloid (dry basis) per square foot of surface area of the cheese products (moist basis), preferably from about 0.05 to about 0.10 grams of hydrocolloid per square foot of surface area. The method of the present invention is particularly suitable for the treatment of large quantities of cheese slices produced in a high speed continuous operation. In this connection, the method of the present invention is suitable for applying starch or starch mixtures to cheese produced at a rate of from about 3 to about 12 pounds of cheese per square foot of chill roll surface per hour. For a five foot diameter by 10 foot long chill roll, this corresponds to a production rate of 4,800 to about 18,400 pounds of cheese per hour. The method of the invention is suitable for coating cheese slices which are cut from a loaf, at a rate of from about 600 to about 3,000 pounds of cheese slices per hour per slicer. The lower level of production rate for cheese slices which are cut from a loaf is due to overspray which results from spraying individual slices of cheese.

It has been found that the application of the hydrocolloid need be only on a single surface of the cheese to effect suitable separation of stacks of cheese slices. Of course, when only one surface of the cheese slice is coated, the stack of slices must be arranged so that the coated surface of the slice is in contact with the non-coated surface of the adjacent slice. At levels below the indicated range, stacked individual slices of various cheese products, as previously discussed, are not readily separated. Levels higher than the indicated range may be used, but no additional benefit is derived from such higher levels and the cost of application is higher. Also, at levels higher than the indicated range, the hydrocolloid provides a visible, dull surface on the cheese product which is considered to be undesirable. It is not necessary that the hydrocolloid dispersion provide a continuous film and at lower levels of application within the indicated range the hydrocolloid is usually discontinuous. The amount of discontinuity is not important so long as the level of application is within the indicated range.

In a preferred method of application, a fluid dispersion of the hydrocolloid is first prepared. The fluid dispersion is then heated to effect hydration and pasteurization as previously indicated. The heated fluid dispersion of the hydrocolloid is then sprayed onto the surface of a web of cheese as the cheese web is being produced by the apparatus previously described or other suitable apparatus. As indicated, the point of application of the fluid dispersion of the hydrocolloid is not critical. It is not necessary that the moisture contributed by the fluid dispersion of the hydrocolloid be removed completely from the surface of the cheese product. While some moisture loss will occur as the cheese web is being cooled on the drum of the cheese apparatus, complete drying of the spray of the fluid dispersion is not required. At the indicated level of application of the fluid dispersion of the hydrocolloid, as much as about 0.5 to about 1.0 percent of moisture may be contributed by the fluid dispersion, based on a weight of the cheese product.

The following examples further illustrate various features of the present invention, but are intended to in no way limit the scope of the invention, which is defined in the appended claims:

EXAMPLE I

A cheese food formulation having 42 percent moisture was prepared from the following list of ingredients:

| Ingredients | Weight Percent |
|---|---|
| Cheddar cheese | |
| Aged 6 months | 36.0 |
| Aged 1 month | 36.0 |
| Whey powder | 5.0 |
| Non-Fat Dry Milk | 3.5 |
| NaCl | .5 |
| Emulsifying Salts | 2.6 |
| Sorbic Acid | .2 |
| Water | 16.2 |

The cheese food was prepared by mixing together the above ingredients in a process cheese cooker as heat was applied to the cooker. The cheese food formulation was heated to a temperature of 165°F at which time the cheese food formulation was fluid.

The cheese food formulation was then formed into single slices by means of apparatus as previously described. The cheese food formulation was pumped to a hopper 15 which fed the cheese food formulation through a nozzle 17 into the bite of a roll 13 and a drum 11. A cheese web 14 was formed on the surface of the drum 11 and was taken off onto a roll 19 where the web of cheese was cut into slices by means of slitting knives 21.

A dispersion was prepared having 3 percent cornstarch and 97 percent water. The slurry was prepared by slowly adding the cornstarch to the water as the water was stirred. The starch dispersion was then heated to a temperature of 185°F so as to gelatinize the starch and was held at that temperature until used. The minimum holding time was 5 minutes.

The hot starch dispersion was then sprayed onto the cheese web 14 on the drum 11 at a point immediately following the formation of the cheese web 14 between the drum 11 and the roll 13. The starch dispersion was uniformly applied by means of spray nozzles onto the surface of the cheese web at a level sufficient to provide 0.072 grams of starch (dry basis) per square foot of cheese web surface (wet basis).

The cheese web was formed into stacked strips of cheese and the stacked strips were cut at periodic intervals to provide stacks of cheese food slices having a rectangular size of 3 inches by 3 inches and having 8 slices per stack. The stacks of slices were stored at a temperature of 45°F for a period of 150 days. At the end of this storage period the slices were examined and it was determined that the slices readily separated from each other.

A control run was also made from the same cheese food formulation as described above. In the control run no starch was applied to the cheese web during the formation of the stacked slices. When these stacks of slices were examined after a comparable period of storage, it was determined that the individual slices were very difficult to separate from each other and in most cases an individual slice would tear before complete separation could be made.

EXAMPLE II

A cheese food formulation was prepared in accordance with the formulation of Example I. The cheese food formulation was made into stacks of individual slices as described. Various hydrocolloid materials were prepared as fluid dispersions and were heated and sprayed onto cheese slices. The hydrocolloid materials used were cornstarch, guar gum, kappa carrageenan, sodium alginate, carboxymethyl-cellulose and a mixture containing 20 percent by weight of kappa carrageenan and 80 percent by weight of cornstarch.

The results of the use of each hydrocolloid is set forth below in Table I.

TABLE I

| Hydrocolloid | Level of Use—grams/ft$^2$ | Remarks Concerning Release of Slices |
|---|---|---|
| Control — no hydrocolloid | — | Poor separation — some tearing |
| Cornstarch | .07 | Excellent separation |
| Guar Gum | .05 | Fair separation — tacky surface |
| Kappa Carrageenan | .05 | Fair separation — surface tacky |
| Sodium Alginate | .05 | Poor to fair separation — tacky |
| Carboxymethylcellulose | .01 | Fair separation — sli tacky |
| Kappa Carrageenan 20% Cornstarch 80% | .05 | Good separation — not tacky |

In accordance with the present invention, a method has been provided wherein stacked slices of cheese products may be readily separated from each other. The method is particularly adapted to the preparation of stacked slices of cheese products having higher moisture than process cheese. The method is also applicable to lower moisture cheese wherein a sticking problem may be encountered. The method of the invention is suitable for high speed production of individual slices of cheese which are arranged in a stacked array.

What is claimed is:

1. In a method for the high-speed, continuous preparation of cheese slices which includes the steps of forming the cheese into a sheet on a chilled conveying surface, slitting the cheese sheet into ribbons, stacking the ribbons to form a strip of stacked ribbons and transversely cutting the strip of stacked ribbons to form a stack of cheese slices, the improvement comprising providing an aqueous dispersion of a hydrocolloid, said hydrocolloid being present in said hydrocolloid dispersion at a level of from about two to about five percent by weight of the dispersion, heating said aqueous hydrocolloid dispersion to a temperature of from about 160°F to about 200°F for a period of time of at least about 30 minutes at the lower temperature to at least about 5 minutes at the higher temperature and at least intermediate periods of time at intermediate temperatures so as to effect pasteurization of the dispersion, and spraying said aqueous hydrocolloid dispersion onto at least one surface of said cheese sheet or said cheese ribbons prior to stacking said cheese ribbons, so as to provide a thin film of said hydrocolloid interposed between the cheese slices stacked in face-to-face relationship in said stack at a level of from about 0.01 to about 1.0 grams per square foot of surface of said cheese slices, whereby said cheese slices may be subsequently easily separated one from another, said hydrocolloid being selected from the group consisting of edible food starch and mixtures of edible food starch and a gum selected from the group consisting of guar gum, carob bean gum, gum tragacanth, gum karaya, carrageenan, alginate, and carboxymethyl cellulose, said starch being present in said mixture at a level of at least about fifty percent by weight.

2. A method in accordance with claim 1 wherein said heating is to a temperature of from about 180°F to about 195°F for a time sufficient to pasteurize said dispersion and to gelatinize said starch.

* * * * *